(12) United States Patent
Yamaguchi

(10) Patent No.: US 7,171,437 B2
(45) Date of Patent: Jan. 30, 2007

(54) RESIDUE CALCULATING UNIT IMMUNE TO POWER ANALYSIS

(75) Inventor: Atsuo Yamaguchi, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 733 days.

(21) Appl. No.: 10/614,831

(22) Filed: Jul. 9, 2003

(65) Prior Publication Data

US 2004/0064274 A1  Apr. 1, 2004

(30) Foreign Application Priority Data

Sep. 30, 2002  (JP)  ............... 2002-286182

(51) Int. Cl.
*G06F 7/72* (2006.01)
(52) U.S. Cl. .................................. 708/491
(58) Field of Classification Search ............. None
See application file for complete search history.

(56) References Cited

U.S. PATENT DOCUMENTS

| 5,961,578 | A | * | 10/1999 | Nakada | 708/491 |
|---|---|---|---|---|---|
| 6,088,453 | A | * | 7/2000 | Shimbo | 380/28 |
| 6,434,588 | B1 | * | 8/2002 | Kim et al. | 708/672 |
| 6,820,105 | B2 | * | 11/2004 | Blaker | 708/491 |
| 6,968,354 | B2 | * | 11/2005 | Kaminaga et al. | 708/491 |
| 7,076,061 | B1 | * | 7/2006 | Lenstra et al. | 380/44 |
| 2002/0101984 | A1 | | 8/2002 | Asami | |
| 2003/0033340 | A1 | | 2/2003 | Asami | |

FOREIGN PATENT DOCUMENTS

| JP | 7-20778 | 1/1995 |
|---|---|---|
| JP | 10-269060 | 10/1998 |
| JP | 11-212456 | 8/1999 |
| JP | 2001-266103 | 9/2001 |

* cited by examiner

*Primary Examiner*—D. H. Malzahn
(74) *Attorney, Agent, or Firm*—McDermott Will & Emery LLP

(57) ABSTRACT

A power-residue calculating unit includes a K register connected to a first internal bus for once storing an intermediate calculation result to be discarded when a power-residue calculation is executed in accordance with a binary method. Therefore even when data to be discarded appears during the calculation, a write into K register is performed, so that current in a write operation flows thereby improving immunity against Power Analysis.

9 Claims, 10 Drawing Sheets

RESIDUE CALCULATING UNIT IMMUNE TO POWER ANALYSIS

BACKGROUND OF THE INVENTION

1. Field of the Invention

The present invention relates to power-residue calculating units used for encryption and decryption of information applicable in the fields of telecommunications network, traffic, finance, medical services, distribution and so on. More particularly, the present invention relates to a power-residue calculating unit using a Montgomery algorithm.

2. Description of the Background Art

Owing to the technological development in the field of telecommunication, security (namely, to prevent criminal use or destruction of data) over a communication network has received a great deal of attention. Therefore, encryption and decryption of information are frequently used. The applicable fields of encryption and decryption range from telecommunication to traffic, finance, medical services, distribution and so on. This type of encryption and decryption are required to realize an advanced security based on a simple concept.

To facilitate understanding of this type of technique, a concept of encryption/decryption of information will be briefly described. In the world of encryption, "asymmetric cipher algorithm" is superior. The asymmetric cipher algorithm refers to a cipher algorithm using different encryption and description keys, where one of which cannot be "easily calculated" from the other. An RSA (Rivest-Shamir-Adleman scheme) cipher using a power-residue calculation (a residue is obtained by multiplying a certain number X several times and then dividing the result by another number N) is representative of the asymmetric cipher algorithm.

Basically, the power-residue calculation in accordance with the following formula (1) is used to generate an RSA cipher. Formula (1) means that a residue is obtained by dividing $X^Y$ by N. In formula (1), X represents a plaintext to be subjected to encryption (or decryption), where Y and N are keys for encryption (or decryption).

$$X^Y \bmod N \quad (1)$$

The power-residue calculation facilitates encryption and decryption of information. If the operand bit lengths of X, Y, and N are increased, decryption of each key becomes difficult.

However, the greater operand bit length requires a longer period of time for the power-residue calculation. Then, what is most important is how to reduce the time for the power-residue calculation with a greater operand bit length.

Next, encryption and decryption processes using the power-residue calculation will be described with an RSA cipher by way of example.

[Encryption and Decryption of RSA Cipher]

For decryption of the RSA cipher, the following equation (2) is used.

$$C = M^e \bmod N \quad (2)$$

For decryption, the following equation (3) is used.

$$M = C^d \bmod N \quad (3)$$

Here, M represents a plaintext for encryption, and C represents a plaintext which has been subjected to encryption, i.e., a ciphertext. Further, e and N in equation (2) are encryption keys, whereas d and N in equation (3) are decryption keys. Further, the relationship as shown in the following equations (4) and (5) is assumed.

$$N = p \cdot q \quad (4)$$

$$1 \equiv e \cdot d \bmod \{\mathrm{LCM}(p-1, q-1)\} \quad (5)$$

Here, "$\equiv$" indicates that the left and right sides are similar to each other, and "LCM" is an abbreviation for a least common multiple. Further, p and q are relatively prime integers. Note that e and N are public keys, whereas d, p and q are secret keys.

Equations (4) and (5) both define conditions of numeric values for the power-residue calculation in a cipher algorithm. Equation (4) indicates that N is a product of relatively prime large prime numbers p and q. Since p and q are both odd numbers, N should also be an odd number. Equation (5) indicates that a residue, which is obtained by dividing a product of e and d by a least common multiple of values obtained by subtracting 1 respectively from p and q shown in equation (4), is 1.

Under the conditions specified in equations (4) and (5), plaintext M is encrypted by equation (2), and encrypted plaintext M (ciphertext C) is decrypted by equation (3).

[Method of Power-Residue Calculation]

A method of a power-residue calculation used for encryption/decryption will now be described. The power-residue calculation for $A = M^e \bmod N$ is carried out with use of an iterative square product method as shown in the following flow 1 with a binary digit expansion of an integer e being $e^{k-1} \ldots e^1 e^0$.

```
(Flow 1)
begin
    A = 1
    for i = k - 1 to 0
    begin
        A = A² mod N                    ...(6)
        If e^i = 1   then A = A·M mod N  ...(7)
    end
end
```

A solution of the power-residue calculation would be equal to A.

As described above, the calculation is based on multiplication and division (mod calculation) as shown in equations (6) and (7). The multiplication provides A×A or A×M for a value of A having an initial value of 1. The division provides mod N for a value obtained by each multiplication (a calculation of a residue when divided by N). Calculations are iteratively performed in accordance with a bit value of "e" with a pair of "multiplication and division" (A×A mod N, A×M mod N). More specifically, "multiplication and division" is performed in accordance with each bit starting from the most significant bit to the least significant bit of "e".

As described above, in the power-residue calculation, a solution is obtained by iteratively performing basic residual calculations (mod calculation). The iterative frequency per se is at most several hundreds to several thousands of times, which can be processed by a software at high speed.

However, to carry out the residue calculation per se, i.e., division, by a hardware, a large calculation circuit and a complicated process are required, and there have been demand for an improvement. Since large integers of about 1024 bits are usually used for e, d, M, N and so on, even a high-speed exponential calculation still requires multiple precision multiplication and residual calculation of about 1500 times on average per RSA calculation. In particular, various high-speed methods, including an approximation method, residual table method and Montgomery algorithm, have been proposed for the residual calculation.

To increase the speed of the power-residue calculation mostly used for a public key cryptograph representative of the RSA cipher, the speed of one residual calculation must be increased. A Montgomery algorithm provides high speed residual calculation. In particular, in the multiplication residual calculation, division can be simplified by e.g., bit shift. Thus, the power-residue calculation used for a public key cryptograph (e.g., RSA cipher) can be performed at higher speed.

On the other hand, the Chinese remainder theorem states that a calculation modulo a composite number can be carried out by calculations modulo relatively prime factors of the composite number. If this is applied to RSA encryption with 1024-bit length, in practice, only a calculating circuit with a modulus of an integer of a 512-bit length (here corresponding to p and q), rather than a power-residue calculating circuit modulo N of a 1024-bit length, is required as hardware. This contributes to miniaturization of the hardware.

As described above, the size of the calculating circuit disadvantageously increases since the power-residue calculation involves a highly complicated process of basic residue calculation (mod calculation). Then, Montgomery has proposed that a solution can be obtained by "multiplication" and a simple bit-string process, rather than by the above described general method of residual calculation (mod calculation). The method proposed by Montgomery will be briefly described in the following.

[Montgomery Algorithm]

A Montgomery algorithm implementing high speed residual calculation will be described.

The Montgomery algorithm is based on the fact that use of residual modulus N (N>1) and a cardinal number R (R>N) which is relatively prime with respect to residual modulus N allows calculation of $TR^{-1}$ mod N to be performed only by division by cardinal number R with a dividend being T. This eliminates the need for division by N for the residual calculation.

Here, N, R, $R^{-1}$ and T are integers. Dividend T satisfies $0 \leq T < R \cdot N$. $R^{-1}$ is an inverse of cardinal number R according to residual modulus N. Further, consider an integer N' that satisfies a relation of $R \cdot R^{-1} - N \cdot N' = 1$ ($0 \leq R^{-1} < N$, $0 \leq N' < R$). Further, if a power of 2 is used for cardinal number R, the division by cardinal number R can be replaced by a shift operation. Thus, a high speed calculation of $T \rightarrow 4TR^{-1}$ mod N ($TR^{-1}$ mod N with a dividend being T) is enabled.

An algorithm MR (T) of $T \rightarrow TR^{-1}$ mod N is given below as algorithm 1. Note that in algorithm 1, (T+m·N)/R has been proved to be always divisable.

(Algorithm 1) Algorithm Y=MR (T) of $T \rightarrow TR^{-1}$ mod N is given by the following sequence.

$$M = (T \bmod R) \cdot N' \bmod R \quad (8)$$

$$Y = (T + m \cdot N)/R \quad (9)$$

if Y≧N then Y=Y−N
Y<N then return Y

A single MR provides only $TR^{-1}$ mod N rather than a residue T mod N. Thus, to find residue T mod N, an MR calculation is again performed using a product of MR (T) and preliminary found $R^2$ mod N as shown below.

$$MR(MR(T) \cdot (R^2 \bmod N)) = (TR^{-1} \bmod N) \cdot (R^2 \bmod N) \cdot R^{-1} \bmod N$$
$$= TR^{-1} \cdot R^2 \cdot R^{-1} \bmod N$$
$$= T \bmod N$$

Thus, residue T mod N can be found.

An algorithm implementing the multiplication residual calculation by the Montgomery method using the iterative square product method (iterative square method) of the power-residue calculation is given below. Search is performed starting from an upper bit of key e and, if the bit value of the key is 1, the Montgomery multiplication residual calculation of MR (X·Y) is performed.

```
Y = Rr   (Rr = R² mod N (R = 2^(k+2)))
X = M
X = MR (X·Y)                              ...(10)
Y = MR (1·Y)                              ...(11)
for j = k to 1
    if e_j == 1   then Y = MR (X·Y)       ...(12)
    if j > 1      then Y = MR (X·Y)       ...(13)
end for
Y = MR (1·Y)                              ...(14)
Y = Y mod N                               ...(15)
```

Here, MR (X·Y) and MR (Y·X) are equal, where $e_j$ represents j-th bit of key e. In the case of an integer with 512-bit length, k=512. The power-residue calculation of 512 bits can be implemented by the Montgomery multiplication residue calculation of 514 bits and the residual calculation of 512 bits.

The Montgomery multiplication residual calculation result P=MR (B·A) is found in the following manner by a sequential calculation of a cardinal number W which is most suitable for being implemented as hardware.

```
W = 2^d
N0' = N' mod W
P = 0
for j = 0 to k
    M = (P mod W) · N0'                           ...(16)
    P = ((P+(A mod W)·B·W+M·N)/W)                 ...(17)
    A = A/W                                       ...(18)
end
```

Here, d is a natural number depending on the hardware. Thus, Montgomery multiplication residual calculation result P can be found. Then, 514-bit Montgomery multiplication residual calculation result P=MR (B·A) can be found in the following manner by a sequential calculation of cardinal number 2 where d=1.

```
N0' = N' mod 2
P = 0
for j = 0 to 514
    M = (P mod 2) · N0'                           ...(19)
    P = ((P + (A mod 2)·B·2+M·N)/2)               ...(20)
    A = A/2                                       ...(21)
end
```

As described above, to implement the power-residue calculation, a common practice is to use the Montgomery method for the 512-bit length power-residue calculation in the hardware and to use a process making use of the Chinese remainder theorem in the software. There are a plurality of kinds of hardware implementations, which may be employed in practice.

As conventional techniques for the RSA cipher, for example, Japanese Patent Laying-Open No. 7-20778 discloses RSA cipher, Montgomery method and a correction device, and Japanese Patent Laying-Open No. 11-212456 discloses RSA cipher and Montgomery method.

Furthermore, for example, Japanese Patent Laying-Open No. 10-269060 discloses RSA cipher, elliptical cryptography and Montgomery method.

For hardware for encryption using the algorithm described above, a so-called "Power Analysis" scheme may be used to externally search for an encryption key.

In equipment provided with ciphers such as personal computers, mobile phones and IC cards, Simple Power Analysis, Differential Power Analysis and the like are known as a scheme to observe consumed current in LSI to search for a key for encryption.

Here, the hardware for performing the encryption processing for the RSA cipher as described above desirably has a highest possible immunity against Power Analysis.

For this purpose, it is desirable that the consumed current pattern of the hardware has so fewer characteristics that the internal algorithm cannot be estimated. Moreover, it is desirable that the current pattern depending on confidential data that cannot be controlled externally does not exist. In addition, it is desirable that there is a low correlation between externally controllable input data and consumed current values and that there are fewer characteristics in the level pattern of the correlation between the externally controllable input data and the consumed current values.

In the power-reside calculation described above, the process is performed with a bit value of "e" as a unit. Therefore it is desirable that the consumed current does not vary depending on "1" or "0" of the bit value.

SUMMARY OF THE INVENTION

The object of the present invention is to provide a power-residue calculating unit applicable to a cipher processing circuit and the like with a reduced circuit scale, with an increased speed and with improved security against Power Analysis.

In summary, the present invention provides a power-residue calculating unit including a first register group, a second register group, a first internal bus, a second internal bus, a Montgomery multiplication residue calculation executing portion, a power-residue calculation executing portion, and a pseudo calculation executing portion.

The first register group holds a first kind of data. The second register group holds a kind of data to be referred to concurrently with the data held in the first register group. The first internal bus is connected to the first register group. The second internal bus is connected to the second register group. The Montgomery multiplication residue calculation executing portion is connected to the first and second internal buses for concurrently referring to values held in the first and second register groups and executing a Montgomery multiplication residue calculation. The power-residue calculation executing portion is connected to the first and second internal buses and the Montgomery multiplication residue calculation executing portion for concurrently referring to values held in the first and second register groups, communicating data with the Montgomery multiplication residue calculation executing portion, and executing a power-residue calculation. The pseudo calculation executing portion executes in a pseudo manner an intermediate calculation process that can be omitted to obtain each calculation result of the Montgomery multiplication residue calculation and the power-residue calculation.

Therefore the advantage of the present invention is to provide a power-residue calculating unit capable of high speed processing with a reduced circuit scale. In addition, an intermediate calculation process is executed in a pseudo manner that can be omitted to obtain the calculation result of the Montgomery multiplication residue calculation and the power-residue calculation, thereby improving the immunity against Power Analysis.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment
(Configuration for Speeding Up Calculation)

A configuration of a power-residue calculating unit of a first embodiment that is less susceptible to Power Analysis will be described based on first and second configurations for speeding up the calculation in the power-residue calculating unit as described below.

[First Hardware Configuration of Power-Residue Calculating Unit]

Figure 1:
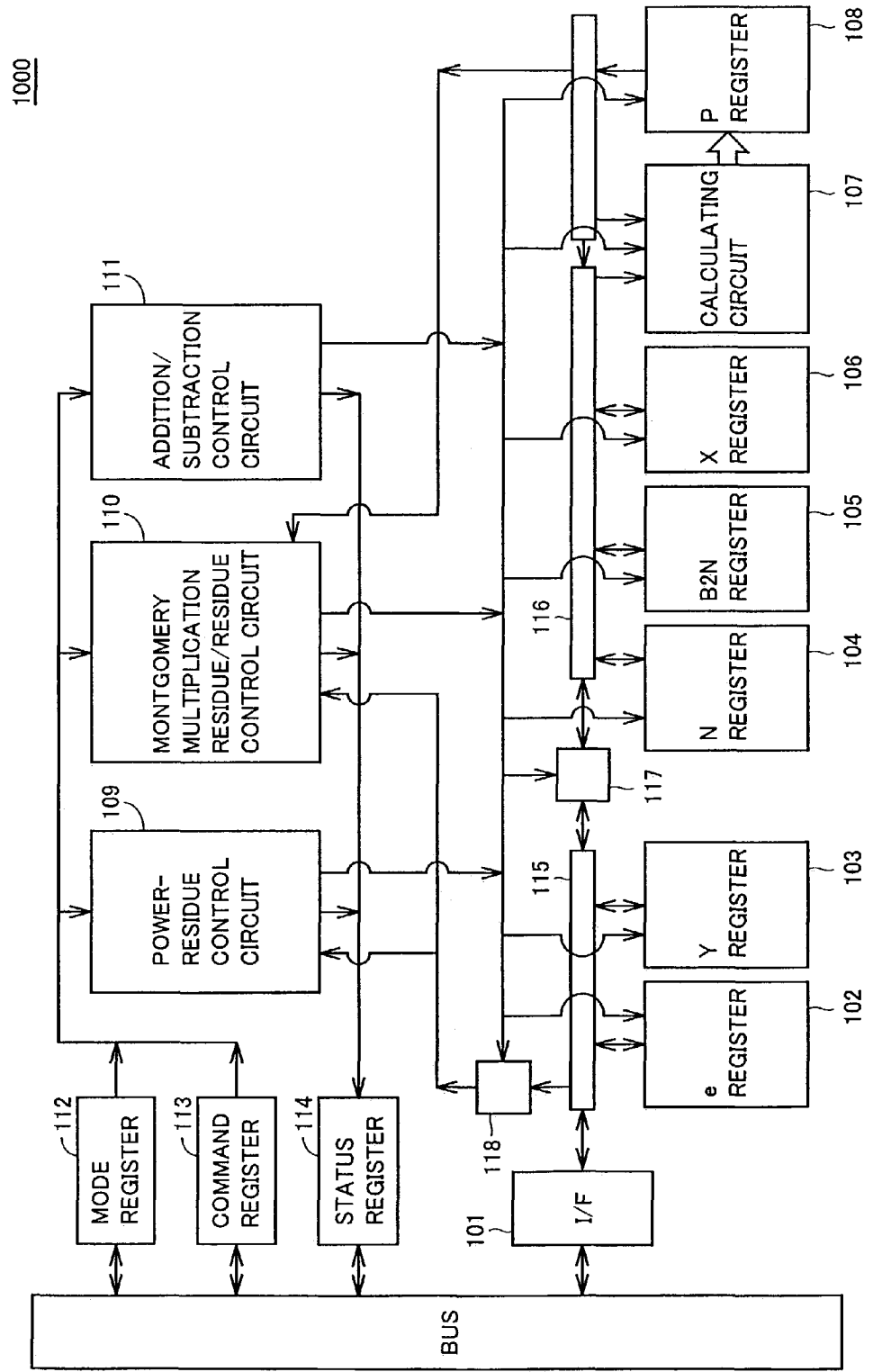
FIG. 1 is a schematic block diagram illustrating a first configuration for speeding up a calculation in a power-residue calculating unit.

Referring to FIG. 1, a power-residue calculating unit 1000 having a first configuration for speeding up the calculation of the power-residue calculating unit includes: an I/F (interface) circuit 101 interfacing with an external bus; an e register 102 holding a key e; a Y register 103 holding a multiplier Y for Montgomery conversion; an N register 104 holding a key N; a B2N register 105 holding a value of 2B+N calculated during Montgomery conversion; an X register 106 holding a plaintext X; a calculating circuit 107 performing calculations for encryption and decryption; a P register 108 holding a calculation result P; and a power-residue control circuit 109 serving as a state machine when a power-residue calculation is executed.

Power-residue calculating circuit 1000 further includes: a Montgomery multiplication residue/residue control circuit 110 serving as a state machine when a Montgomery multiplication residue calculation and a residue calculation are executed; an addition/subtraction control circuit 111 controlling calculations of addition and subtraction; a mode register 112 holding various modes; a command register 113 holding a command; a status register 114 holding a status; an internal bus 115 connected to interface circuit 101, e register 102 and Y register 103 for communicating data between various registers; and an internal bus 116 connected to N register 104, B2N register 105, X register 106, calculating circuit 107, and P register 108 for communicating data between various registers and calculating circuit 107; and a bus dividing circuit 117 connected to internal buses 115 and 116 for controlling data input/output between internal buses 115 and 116.

Power-residue calculating circuit 1000 further includes an Ej/Yj detecting portion 118 between internal bus 115 and power-residue control circuit 109 and Montgomery multiplication residue/residue control circuit 110.

[Calculation Method of Montgomery Calculation]

In performing power-residue calculations, Montgomery-method multiplication residue calculations and residue calculations are used to attain a high-speed. Among others, a calculation method of the conditional Montgomery calculation [if $e_j$==1 then Y=MR (X·Y)] in equation (12) will now be described.

In executing a loop of equations (12) and (13), key e held in e register 102 is read onto internal bus 115. At the same time, power-residue control circuit 109 instructs Ej/Yj detecting portion 118 of bit j to be read of key e depending on the state of the counter included therein. Ej/Yj detecting unit 118 reads j-th bit value ej of key e read out onto internal bus 115 and provides the same to power-residue control circuit 109.

As multiplier A is right-shifted bit by bit because of equation (21), Amod 2 in equation (20) corresponds to j-th bit of multiplier A, that is, j-th bit Yj of multiplier Y held in Y register 103. Therefore in performing a loop of equations (19)–(21), multiplier Y held in Y register 103 is read out onto internal bus 115. At the same time, Montgomery multiplication residue/residue control circuit 110 instructs Ej/Yj detecting portion 118 of bit j to be read of multiplier Y depending on the state of the counter included therein. Ej/Yj detecting portion 118 reads j-th bit value Yj of multiplier Y read out onto internal bus 115 and provides the same to Montgomery multiplication residue/residue control circuit 110.

The similar process is also performed for residue calculations.

In a multiplication calculation, bus dividing circuit 117 turns off and multiplier Y is sent to Ej/Yj detecting portion 118. In a square calculation, multiplicand Y is sent to calculating unit 107 with bus dividing circuit 117 turning on and also to Ej/Yj detecting portion 118 as a multiplier at the same time.

[Second Hardware Configuration of Power-Residue Calculating Unit]

Power-residue calculating unit 1100 with a modified configuration of power-residue calculating unit 1000 shown in FIG. 1 will now be described.

Figure 2:
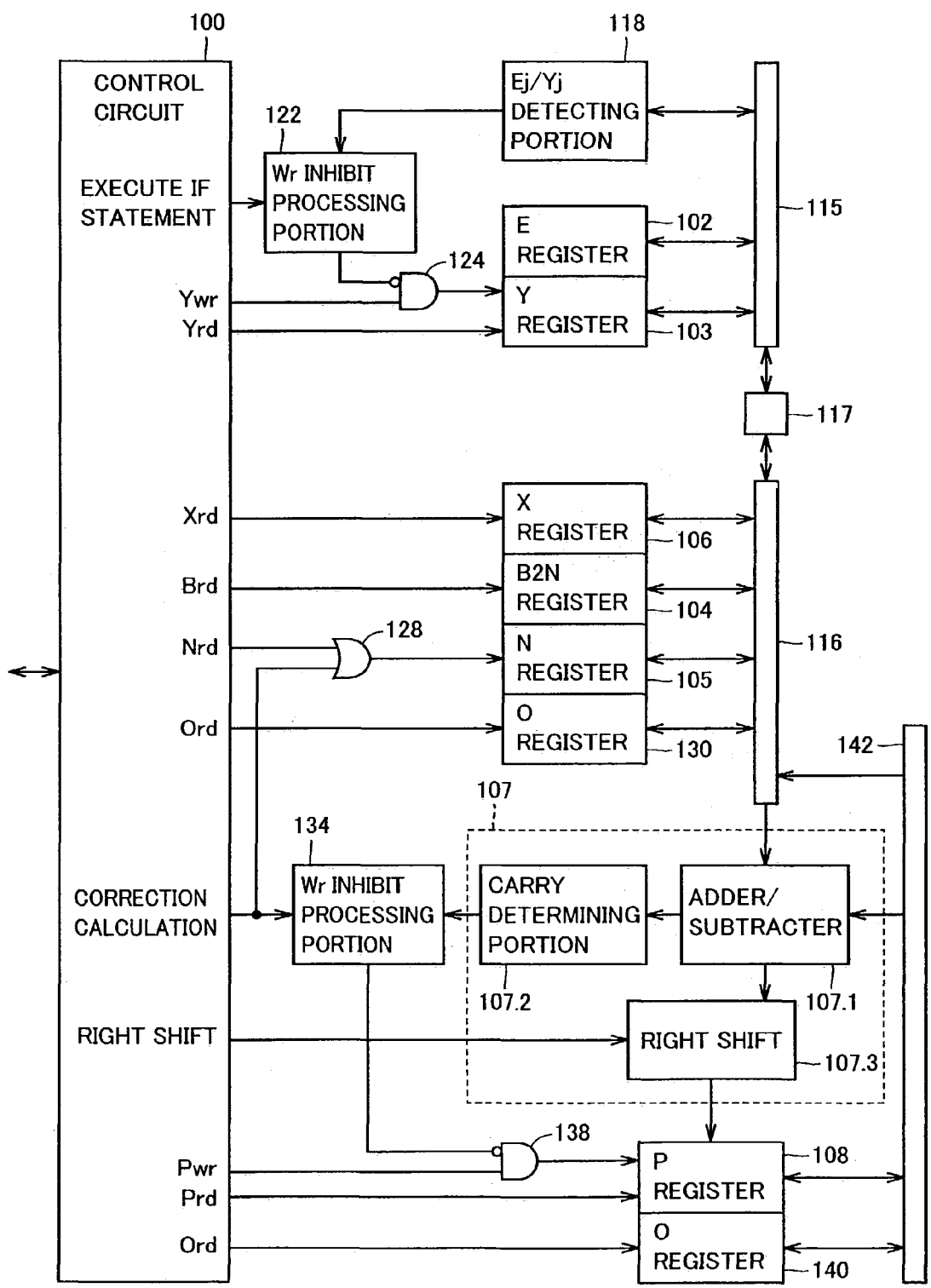
FIG. 2 is a schematic block diagram illustrating a second configuration for speeding up a calculation in a power-residue calculating unit.

FIG. 2 is a schematic block diagram illustrating a configuration of power-residue calculating unit 1100 as a second configuration for speeding up the calculation of the power-residue calculating unit.

In the following, the configuration of power-residue calculating unit 1100 in FIG. 2 will be described by contrast with the configuration of power-residue calculating unit 1000 in FIG. 1.

In power-residue calculating unit 1100 in FIG. 2, e register 102, Y register 103, X register 106, B2N register 105, N register 104, P register 108, and Ej/Yj detecting portion 118 are similar to the components of power-residue calculating unit 1000 in FIG. 1.

A control circuit 100 of power-residue calculating unit 1100 includes three circuits of power-residue calculating unit 1000 in FIG. 1, which are power-residue control circuit 109, Montgomery multiplication residue/residue control circuit 110 and addition/subtraction control circuit 111.

Here, a 0 register 130 of power-residue calculating unit 1100 is a register holding a value 0 and is controlled by a signal 0rd from control circuit 100 such that it is selected for the value to be read when X register 106, B2N register 105 and N register 104 are not selected. Note that Y register 103 is selected through bus dividing circuit 117 in place of X register 106 in square calculations. Specifically, in square calculations, selection is made from 0 register 130, Y register 103, B2N register 105, and N register 104. In the following description, X register 106 in the process of multiplication should be read as Y register 103 in square calculations.

Three circuits of power-residue calculating unit 1100, i.e. a calculating unit 107.1, a carry determining portion 107.2 and a right shift circuit 107.3 correspond to calculating circuit 107 in power-residue calculating unit 1000 in FIG. 1.

A register 140 is a register holding a value 0 and is controlled by signal 0rd from control circuit 100 such that it is selected for data to be read when P register 108 is not selected.

A Wr inhibit processing unit 122 inhibits a write into Y register 103 by masking a write signal Ywr to Y register 103 during execution of the if statement described later where (ej)=0 in the conditional expression.

A correction calculation signal from control circuit 100 to N register 104 is provided to N register 104 through an OR gate 128 for instructing that the value in N register 104 is read when a correction calculation is executed.

Wr inhibit processing portion 134 inhibits a write into a P register 108 by masking a write signal Pwr to P register 108 when no correction is needed in execution of the correction calculation described later.

Note that a signal Xxwr from control circuit 100 is a write signal for an Xx register (E register, Y register, X register, or the like), and a signal Xxrd is a read signal for Xx register.

In FIG. 2, the external bus, interface 101, mode register 112, command register 113, status register 114, and the like are not shown.

The basic operation of power-residue calculating unit 1100 is similar to the operation of power-residue calculating unit 1000. In the following, this operation will be described.

The operation of power-residue calculating unit 1100 shown in FIG. 2 uses a left binary method for a power calculation and the Montgomery method for a multiplication residue calculation.

A result of unit element 1 of multiplication subjected to a Montgomery conversion is set in Y register 103 externally, for example, from a CPU (Central Processing Unit) (step S100). Next, a result of an input text subjected to a Montgomery conversion is set in register X 106 externally (for example from CPI) (step S102).

A modulus is set in N register 104 externally (for example from CPU) (step S104).

When R is a constant $2^{1024}$ for Montgomery conversion, the following two lines are repeated 1024 times (j=1023 to 0) (step S106).

```
Y = Y×Y/R mod N            ... square calculation
If ej = 1   then Y = X×Y/R mod N else void X×Y/R mod N
                           ...multiplication
```

Thereafter the value of Y undergoes a Montgomery inverse conversion (Y=1×Y/R mod N) (step S108).

The result of the Montgomery inverse conversion in Y register 103 will be a value of a result of power-residue calculation (step S110).

Here, depending on whether the aforementioned if statement is true or false, write signal Ywr for writing the multiplication result described above into Y register 103 is masked.

In the operation of power-residue calculating unit 100, the following correction calculation is performed in the end of each Montgomery multiplication residue processing such that the result Y of the Montgomery multiplication residue processing falls within the range of N>Y≧0:

if P<0 then P=P+N.

As a result, unlike the operation of power-residue calculating unit 1000, the residue calculation (equation (15)) for putting the result within this range is not executed.

(Montgomery Multiplication Residue Calculation Process of Power-Residue Calculating Unit 1100)

The Montgomery multiplication residue calculation process of power-residue calculating unit 1100 will now be described briefly, where Y=X×Y/R mod N and where B=N−X is executed in the beginning of the Montgomery multiplication residue processing.

A modulus is read from N register 104 with signal Nrd and written into P register 108 with signal Pwr (step S200).

Then X register 106 is read with signal Xrd and P register 108 is read with signal Prd. Calculating unit 107.1 executes a subtraction (P−N) to write the subtraction result into P register 108 with signal Pwr without right-shift (step S202).

P register 108 is then read with signal Prd so that the subtraction result is written into B2N register 105 with a signal Bwr (not shown) from control circuit 100 (step S204). An initial value in P register 108 is assumed 0 (step S206).

Thereafter the following calculation is repeated 1024 times (j=0 to 1023) (step S208).

i) The value in X register 106, the value in N register 104, the value in B2N register 105, and the value in 0 register 130, selected in accordance with Yj and P0, X0, are read in response to signal Xrd, Nrd, Brd, or 0rd (step S210).

ii) An addition/subtraction is executed in calculating unit 107.1 and the result is right-shifted by one bit in right-shift circuit 107.3 and is then written into P register 108 with signal Pwr (step S212).

Thereafter the following correction calculation is executed (step S214).

The value in N register 104 is read. The calculation (P+N) is executed in calculating unit 107.1. Here a right-shift is not performed. If the previous value in P register 108 is negative, the result of the calculation (P+N) is written into P register 108 with signal Pwr. On the other hand if the previous value in P register 108 is 0 or positive, signal Pwr is masked so that the result of the calculation (P+N) is not written into P register 108.

In the foregoing, the description has been made briefly. The operation of power-residue calculating unit 1100 will be described more specifically in the following.

The power-residue calculation (Y=X^e mod N) has the following process using the left binary method, for example, where a key is of 1024 bits.

```
Y = 1                      // set initial value
for j = 1023, 0
    Y = Y×Y mod N          // square residue
    If e[j]   then   Y = X×Y mod N      // multiplication residue
End for
```

Here, e[j] is a j-th bit value of e. The calculation result is assumed as the value in Y register 103.

The following two calculations can be selectively performed without changing a large part of hardware only by selecting X or Y as a multiplicand in the multiplication residue processing for use in the left binary method.

$Y = Y \times Y \bmod N$ $Y = X \times Y \bmod N$

In the right-binary method, X=Y^e mod N can be obtained by the following process.

```
X = 1          // set initial value
for j = 0, 1023
if e[j]   then   X = X×Y mod N      // multiplication residue
Y = Y×Y mod N                        // square residue
End for
```

Here the calculation result is assumed as the value in X register 106.

The following two calculations can be selectively performed without changing a large part of hardware only by adding a function of selecting a register to store the result to a function of selecting a multiplicand in the multiplication residue processing for use in the right binary method.

$Y = Y \times Y \bmod N$ $X = X \times Y \bmod N$

Meanwhile, the aforementioned Montgomery method (Y=Y·X/R mod N) has the following process where Y has a 1024-bit length again.

```
P = 0              // set initial value
For j = 0 to 1023
```

-continued

```
M = (P+Y[j]·X) mod2 = P[0]^Y[j]·X[0]
P = (P+Y[j]·X+M·N)/2            // accumulative addition
End for
P = P-N                         ... (22) // subtraction
If  P<0   then P = P+N          // correction calculation
Y = P                           // store the result
```

In power-residue calculating unit 1000 shown in FIG. 1, the hardware performing the Montgomery method is implemented by calculating the second and third terms in the accumulative addition beforehand and changing a two-term addition to a three-term addition, thereby reducing the hardware for the adder. In other words, $B=2X+N$ is calculated.

On the other hand, in the configuration implementing the process including equation (22) described above, $$B = X + N$$

is calculated beforehand and stored in a register, thereby reducing the hardware for the adder.

In other words, since $M=P[0]{\wedge}Y[j]\cdot X[0]$, a register is selected in accordance with M and Y[j] (j-th bit value of Y) as follows for execution of the accumulative addition.

It is noted that in the following the value stored in P register 108 is represented by "P", the value stored in X register 106 is represented by "X", the value stored in N register 104 is represented by "N", and the value stored in B2N register 105 is represented by "B".

| Y[j] | P[0]^Y[j]·X[0] | rd signal | accumulative addition |
|------|----------------|-----------|-----------------------|
| 0    | 0              | 0rd       | (P+0)/2               |
| 1    | 0              | Xrd       | (P+X)/2               |
| 0    | 1              | Nrd       | (P+N)/2               |
| 1    | 1              | Brd       | (P+B)/2               |

The Montgomery method ($Y=Y\cdot X/R$ mod N) described above can be configured as follows to eliminate $P=P-N$ in equation (22). The brief description after (Montgomery Multiplication Residue Calculation Process of Power-Residue Calculating Unit 1100) illustrates an example of this process.

```
P = 0                              // set initial value
For j = 0 to 1023
    M = (P+Y[j]·X) mod2 = P[0]^Y[j]·X[0]
    P = (P+Y[j]·X-M·N) / 2         // accumulative addition/subtraction
End for
If P < 0   then P = P+N            // correction calculation
Y = P                              // store the result
```

In this case, the following calculation may be performed in the addition/subtraction by storing in a register $B=N-X$ calculated before hand for the second and third terms of the addition/subtraction.

$$P = (P-(N-X))/2$$

Alternatively, the following calculation may be performed in the addition/subtraction by storing $B=X-N$ in a register beforehand.

$$P = (P+(X-N))/2$$

Either of the methods described above can reduce the hardware amount for the adder. Specifically, as $M=P[0]{\wedge}Y[j]\cdot X[0]$, the accumulative addition/subtraction may be executed by selecting a register in accordance with M and Y[j] and performing addition or subtraction as follows.

| Y[j] | M | +/– | rd signal | accumulative addition |
|------|---|-----|-----------|-----------------------|
| 0    | 0 | +   | 0rd       | (P+0)/2               |
| 1    | 0 | +   | Xrd       | (P+X)/2               |
| 0    | 1 | –   | Nrd       | (P–N)/2               |
| 1    | 1 | –   | Brd       | (P–B)/2               |

Here, $B = N - X$.

The Montgomery method ($Y=Y\cdot X/R$ mod N) may be executed by replacing X with Y. In other words, Xrd signal to X register 106 is directed to Y register 103 and is read through bus dividing circuit 117 for execution.

Furthermore, "/2" in the accumulative addition/subtraction is performed by a right shift process. The correction calculation can also be performed as follows with a constant execution time irrespective of input data by masking the write signal in a manner similar to the binary method.

if P<0 then P=P+N else void P+N

More specifically, in a correction calculation, Nrd signal may be provided to N register 104 and write signal Pwr to P register 108 may be masked in accordance with a signal indicative of whether a correction is required or not.

It is noted that in FIG. 2 the selection of Xxrd signal in accordance with M, Yj, the setting of initial value P=0, the calculation and setting of the value to the register storing the value of B, and the like are processed by producing an appropriate control signal in control circuit 100 and providing the signal to the calculating unit. In FIG. 2, the initial value for the power-residue processing is provided, for example, from CPU.

[Configuration of Power-Residue Calculating Unit 1200 of First Embodiment]

Under the preparation described above, a power-residue calculating unit 1200 configured in a manner even less susceptible to Power Analysis will be described below based on the configuration of power-residue calculating unit 1100.

Figure 3:
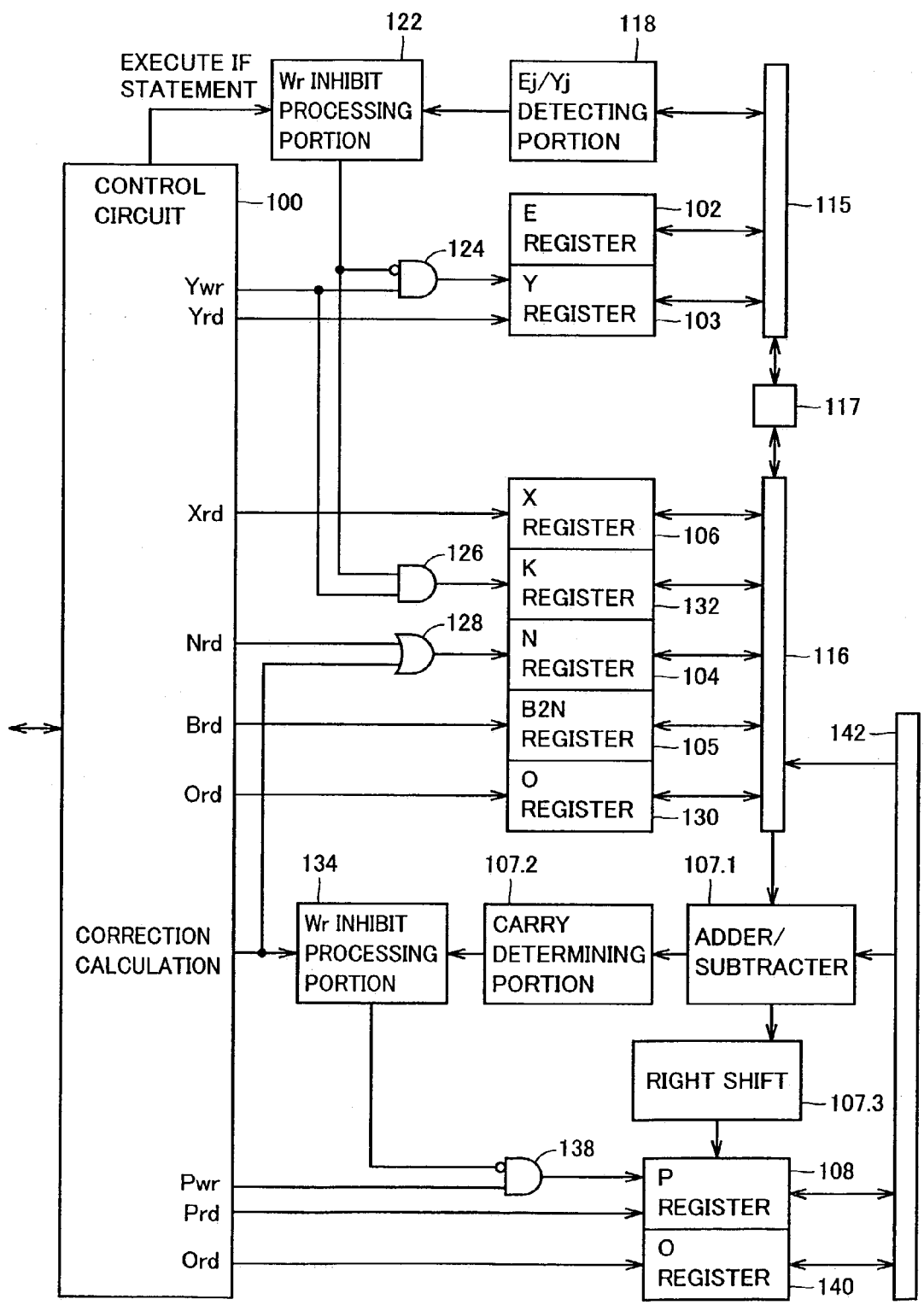
FIG. 3 is a schematic block diagram illustrating a configuration of a power-residue calculating unit 1200 in accordance with a first embodiment of the present invention.

FIG. 3 is a schematic block diagram illustrating the configuration of power-residue calculating unit 1200 in accordance with the first embodiment.

In power-residue calculating unit 1200, as described below, a K register 132 in FIG. 2 is added to power-residue calculating unit 1100 in FIG. 2 to perform a process of if ej=1 Y=X×Y/R mod N else K=X×Y/R mod N in place of the process of if ej=1 Y=X×Y/R mod N else void X×Y/R mod N in the power-residue calculation.

FIG. 3 shows a configuration in the case of the left binary method by way of example.

Referring to FIG. 3, the operation of the additional K register 132 will be detailed.

In the binary method of the power-residue calculation, K register 132 is used as a register for storing a result when the determination of the if statement is "false" during the execution of the if statement described above.

Note that the value of e[j] is verified during the square calculation of Y and defined before the if statement is processed.

Here the process of Y=X^e mod N is performed for 1024-bit data as follows.

```
Y = 1
For j = 1023 to 0
    Y = Y·Y mod N
    If (e[j]=1)  then Y = Y·X mod N  else K = Y·X mod N
End for
```

The Montgomery method is used in the above process as follows.

```
X = X·R mod N
Y = R mod N
For j = 1023 to 0
    Y = Y·Y/R mod N
    If (e[j]=1)  then Y = Y·X/R mod N else K = Y·X/R mod N
End for
Y = Y/R mod N
```

Here signal e[j] from Ej/Yj detecting portion 118 is used to mask write signal Ywr to Y register 103.

When the if statement is executed, AND between an inverted signal of a signal (an inverted signal of signal e[j]) output from Wr inhibit processing portion 122 in response to signal e[j] and write signal Ywr from control circuit 100 to Y register 103 is calculated in gate circuit 124, result of which is provided to Y register 103 as write signal Ywr'.

AND between a signal (an inverted signal of signal e[j]) output from Wr inhibit processing portion 122 in response to signal e[j] and write signal Ywr to Y register 103 is calculated in gate circuit 126, result of which is provided to K register 132 as write signal Kwr.

It is noted that the similar process can be performed with the right binary method.

By configuring power-residue calculating unit 1200 as described above, a write operation for the register is performed similarly whether the condition of the if statement is "true" or "false. Therefore in any case current in a write operation flows so that the immunity against Power Analysis is improved.

[Second Embodiment]

Figure 4:
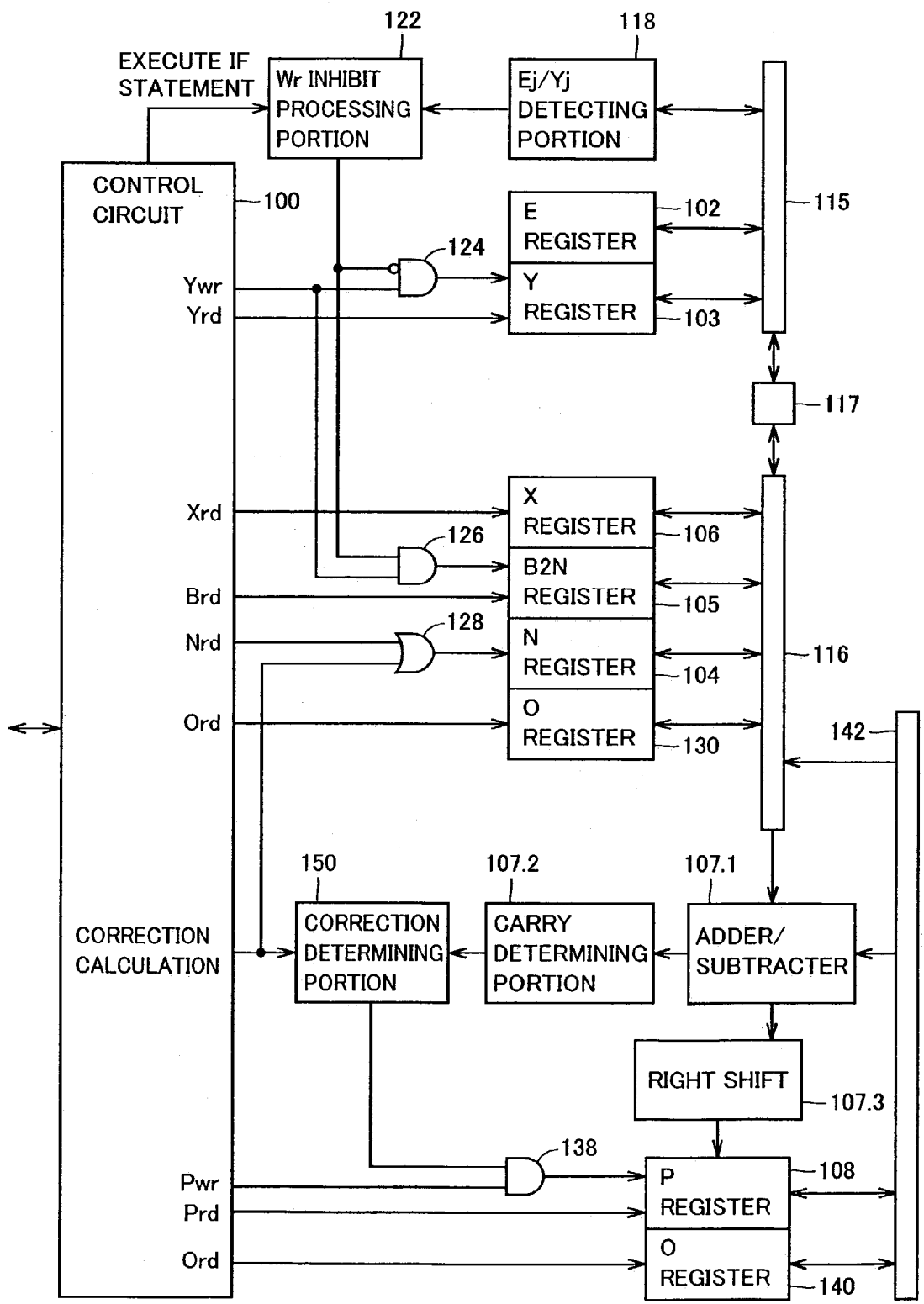
FIG. 4 is a schematic block diagram illustrating a configuration of a power-residue calculating unit 1300 in accordance with a second embodiment of the present invention.

FIG. 4 is a schematic block diagram illustrating a configuration of power-residue calculating unit 1300 in accordance with a second embodiment of the present invention.

As described below, B2N register 105 is used as a register for storing intermediate data B to perform a process of if ej=1 Y=X×Y/R mod N else B=X×Y/R mod N in place of the process of if ej=1 Y=X×Y/R mod N else void X×Y/R mod N during the power-residue calculation.

In other words, in the if statement with logic "false", register 105 also serves as a register performing a dummy process (storing intermediate data B), rather than providing a separate register for storing data as a dummy process.

It is noted that in FIG. 4 a correction determining portion 150 outputting a signal based on whether a correction calculation is required or not and a gate circuit 138' are used in place of Wr inhibit processing portion 134 and gate circuit 138 in FIG. 3.

B2N register 105 is a temporary register for use when the Montgomery multiplication residue is calculated, and may store data without any problems when the logic of the if statement is "false".

The process of Y=X^e mod N is performed for data of 1024 bits as follows. It is noted that the value of data in B2N register 105 is assumed as B2N.

```
Y = 1
For j = 1023 to 0
    Y = Y·Y mod N
    If (e[j]=1)  then Y = Y·X mod N   else B2N = Y·X mod N
End for
```

The Montgomery method is used in the above process as follows.

```
X = X·R mod N
Y = R mod N
For j = 1023 to 0
    Y = Y·Y/R mod N
    If (e[j]=1)  then Y = Y·X/R mod N   else B2N = Y·X/R mod N
End for
Y = Y/R mod N
```

Here signal e[j] from Ej/Yj detecting portion 118 is used to mask write signal Ywr to Y register 103.

When the if statement is executed, AND between an inverted signal of a signal (an inverted signal of signal e[j]) output from Wr inhibit processing portion 122 in response to signal e[j] and write signal Ywr from control circuit 100 to Y register 103 is calculated in gate circuit 124, result of which is provided to Y register 103 as write signal Ywr'.

AND between a signal (an inverted signal of signal e[j]) output from Wr inhibit processing portion 122 in response to signal e[j] and write signal Ywr to Y register 103 is calculated in gate circuit 126, result of which is provided to B2N register 105 as a write signal B2Nwr.

It is noted that the similar process can be performed with the right binary method.

By configuring power-residue calculating unit 1200 as described above, a write operation for the register is performed similarly whether the condition of the if statement is "true" or "false. Therefore in any case current in a write operation flows so that immunity against Power Analysis is improved.

[Third Embodiment]

Figure 5:
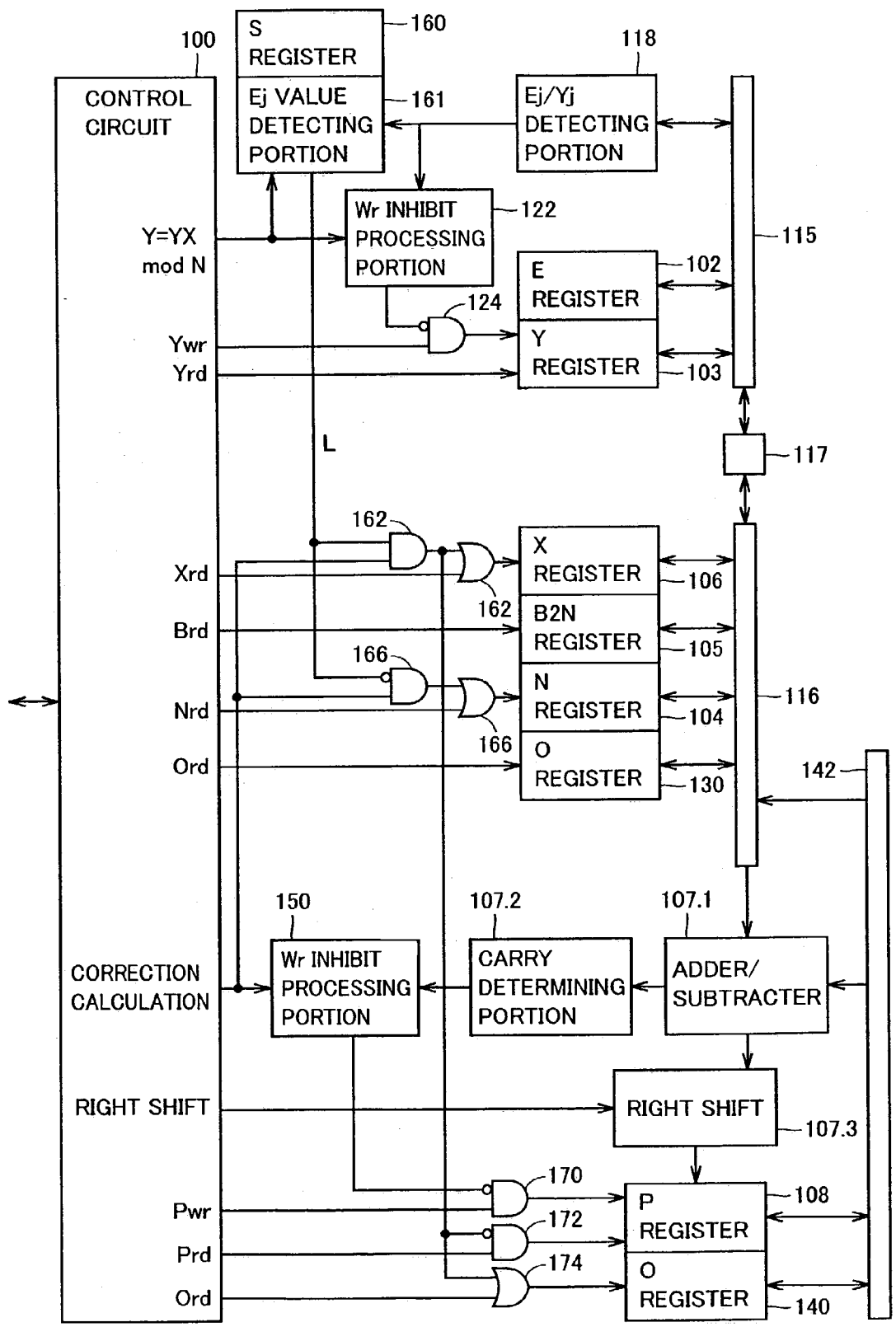
FIG. 5 is a schematic block diagram illustrating a configuration of a power-residue calculating unit 1400 in accordance with a third embodiment of the present invention.

FIG. 5 is a schematic block diagram illustrating a configuration of power-residue calculating unit 1400 in accordance with a third embodiment of the present invention.

In the following, the operation of power-residue calculating unit 1400 shown in FIG. 5 will be described by contrast with the operation of power-residue calculating unit 1100 shown in FIG. 2.

First, in the operation of power-residue calculating unit 1400 shown in FIG. 5, the process of "A result of unit element 1 of multiplication subjected to a Montgomery conversion is set in Y register 103 externally, for example, from a CPU (Central Processing Unit) (step S100)"

is omitted from the process in the power-residue calculation in the operation of power-reside calculating unit 1100 shown in FIG. 2.

Furthermore, in the operation of the correction calculation in the operation of power-residue calculating unit 1100 shown in FIG. 2, the process in step S214:

"The value in N register 104 is read. The calculation (P+N) is executed in calculating unit 107.1. Here a right-shift is not performed. If the previous value in P register 108 is negative, the result of the calculation (P+N) is written into P register 108 with signal Pwr. On the other hand if the previous value in P register 108 is 0 or positive, signal Pwr is masked so that the result of the calculation (P+N) is not written into P register 108."

includes the following additional process:

"When e[j]=1 for the first time, data is read from X register 106 and 0 register 140 in place of N register 104 and P register 108. The calculation (0+X) is executed in calculating unit 107. Whether the previous value in P register 108 is positive or negative, write signal Pwr allows the result of calculation (0+X) to be written in P register."

In other words, power-residue calculating unit 1400 of the third embodiment aims to avoid the following problem.

Namely, where the right binary method is used in the power-residue calculation, the initial value of Y is 1 and the value in Y register 103 does not change until e[j]=1. Once e[j]=1 and Y=XY, the value in Y register 103 becomes dependent on input text X. Therefore the number of consecutive bits 0 from the upper bit of e[j] can be determined externally by varying input texts and observing the timing at which the current depends on the input text.

Therefore the following process is generally performed in power-residue calculating unit 1400 of the third embodiment.

When the condition that e[j]=1 for the first time is satisfied, YX results in X. In other words, if the process for Y=X is performed at the time of e[j]=1 for the first time, irrespective of the prior values of Y, ultimately the same result can be obtained. With the use of such a technique, the values of Y prior to the first-time e[j]=1 become irrelevant so that the initial value of Y can be set to the value dependent on the input text. Therefore with the current dependent on the input text throughout the period of bits of Y, the number of 0s can be unknown.

As shown in FIG. 5, power-residue calculating unit 1400 of the third embodiment is provided with a first-Ej-value detecting portion 161 for detecting the first-time e[j]=1 along with a multiplication circuit capable of altering the multiplication result to X itself in accordance with the detection result.

FIG. 5 shows an example where a Montgomery multiplication residue circuit is used as a multiplication circuit.

The difference between power-residue calculating unit 1000 shown in FIG. 1 and power-residue calculating unit 1400 is summarized as follows.

In power-residue calculating unit 1000 a correction calculation is performed with a residue being obtained collectively in the last place whereas in power-residue calculating unit 1400 a correction calculation is performed at the end of each Montgomery multiplication residue calculation process. Furthermore, B=N−X is calculated at the beginning of each Montgomery multiplication residue calculation process, and a subtraction is executed in calculating unit 107 when B register 105 is selected as the input for calculating unit 107 or when N register 104 is selected. Therefore as the result to be corrected is within the range from (−N) to (N−1), whether the correction calculation is required or not can be determined in carry determining portion 107.2 in calculating unit 107.

The processing in power-residue calculating unit 1400 of the third embodiment will be further detailed.

First of all, the operation of first-Ej-value detecting portion 161 is mainly described.

In the power-residue processing in power-residue calculating unit 1400, an S register 160 is used as follows. S register 160 has its initial value of 0 and stores 1 when EJ (=e[j]) is 1 each time the loop ends.

```
S = 0
For j = 1023 to 0
    Y = Y·Y mod N, EJ = e[j]
    If (EJ = 1)  then   if (S = 1)   then Y = Y·X mode N   else Y = X
        if EJ = 1   then S = 1
End for
```

The Montgomery method is used in the above process as follows.

```
X = X·R mod N
S = 0
For j = 1023 to 0
    Y = Y·Y/R mod N
    If (EJ = 1)  then   if (S = 1)   then Y = Y·X/R mod N else Y = X
        if EJ = 1   then  S = 1
    End for
Y = Y/R mod N
```

As in the process described above, in the power-residue calculating unit 1400 of the third embodiment, the detection signal (L corresponding to EJ) for the first-time e[j]=1 allows the multiplication result to be set to X.

In the correction calculation at the end of the Montgomery calculation, detection signal L for the first-time e[j]=1 allows a value 0 to be selected from 0 register 130 in place of the value in P register 108 or a value in X register 106 to be selected in place of the value in N register 104 or 0 register 130 as an input for calculating unit 107 as follows, thereby resulting in P=X. Thereafter data transfer is performed for storing the value in P register 108 into Y register 103.

| // correction calculation | | |
|---|---|---|
| carry | L | Calculation |
| 1 | 0 | P = P+N |
| 0 | 0 | P = P+0 |
| X | 1 | P = 0+X |

Thereafter through the process for Y=P the multiplication residue result that is positively corrected or the value of X is stored in Y register 103.

Here since the initial value of Y stored in Y register 103 does not affect the final result, a variety of setting methods can be employed in consideration of DPA. For example the value left in Y register 103 in the prior process can be used as it is.

Alternatively, for example, the result after reduction is written in Y register 103 and the result after the Montgomery conversion is written in X register 106, followed by execution of the binary method. Then Y=Y×Y will be (M mod N)×(MR mod N)/R mod N, and thus M×M mod N where R is missing, resulting in a different input. Therefore the matching pattern in the binary method rarely appears.

In the configuration above, S register 160 holding data indicative of whether the first 1 appears is provided. Therefore it becomes unnecessary to set a unit element at the beginning by setting an initial value during the correction calculation for the Montgomery calculation when the first 1 appears. As a result, the number of consecutive 0s at the beginning is hardly discovered as the pattern of current consumption indicative of whether the dependency of input data exists. Such a process can be realized only by switching the operand of the Montgomery correction calculation, with less effect on the current and with the same execution cycle.

[Fourth Embodiment]

Figure 6:
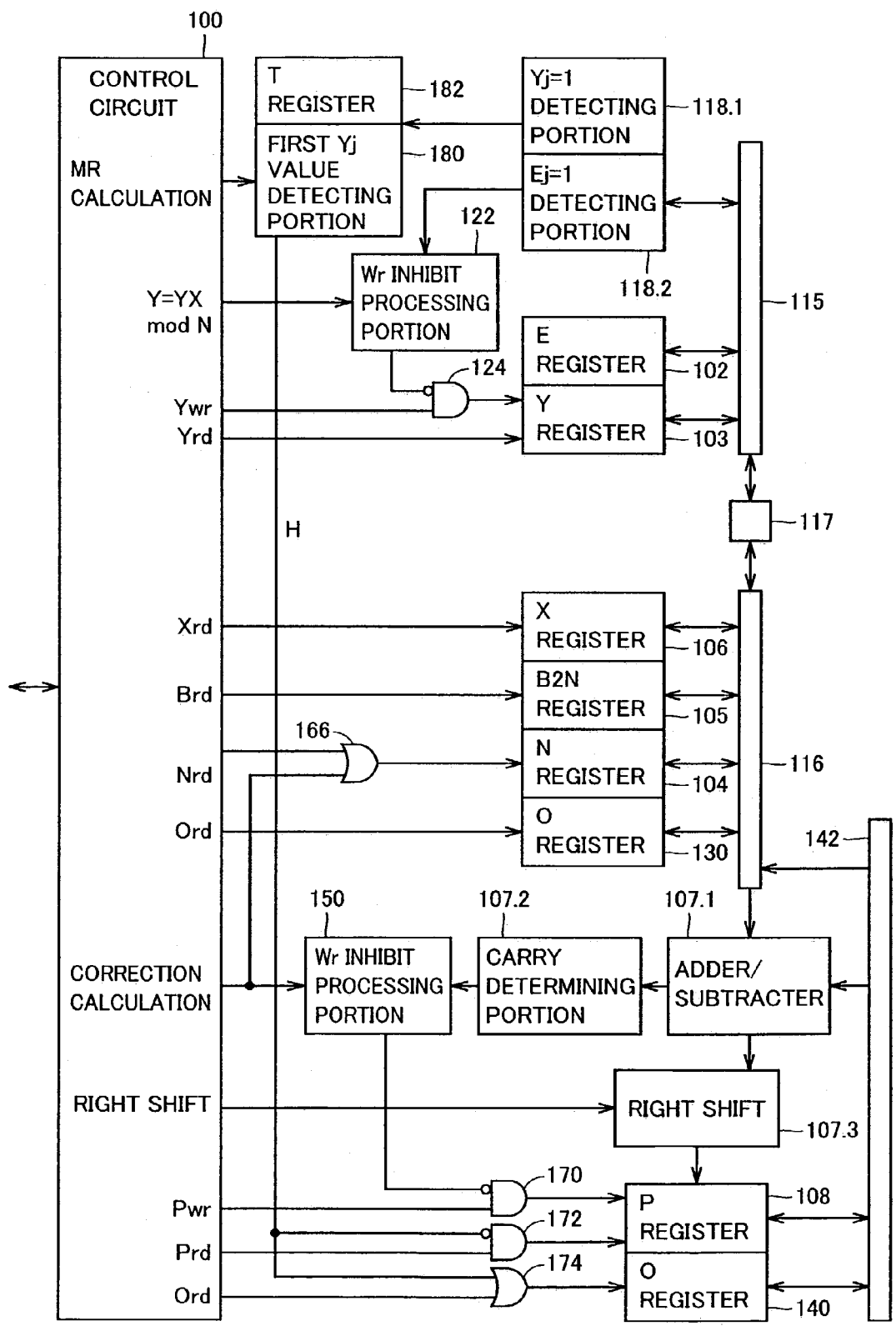
FIG. 6 is a schematic block diagram illustrating a configuration of a power-residue calculating unit 1500 in accordance with a fourth embodiment of the present invention.

FIG. 6 is a schematic block diagram illustrating a configuration of a power-residue calculating unit 1500 in accordance with a fourth embodiment of the present invention.

In the following, the operation of power-residue calculating unit 1500 shown in FIG. 6 will be described by contrast with the operation of power-residue calculating unit 1100 shown in FIG. 2.

In the operation of power-residue calculating unit 1500 shown in FIG. 6, the following process in the Montgomery multiplication residue calculation in the operation of power-residue calculating unit 1100 shown in FIG. 2 will be omitted:

"An initial value of P register 108 is set to 0 (step S206)."

Furthermore, in the following process in the Montgomery multiplication residue calculation of power-residue calculating unit 1100 shown in FIG. 2:

"Thereafter the following calculation is repeated 1024 times (j=0 to 1023) (step S208).

i) The value in X register 106, the value in N register 104, the value in B2N register 105, and the value in 0 register 130, selected in accordance with Yj and P0, X0, are read in response to signal Xrd, Nrd, Brd, or 0rd (step S210).

ii) An addition/subtraction is executed in calculating unit 107.1 and the result is right-shifted by one bit in right-shift circuit 107.3 and is then written into P register 108 with signal Pwr (step S212)", the value read from P register 108 is subjected to addition/subtraction. On the other hand, in power-residue calculating unit 1500 shown in FIG. 6, the process is changed as follows:

"when Yj=1 for the first time in 1024 times, the value in 0 register 140 is read instead of P register 108."

In other words, power-residue calculating unit 1500 of the fourth embodiment aims to avoid the following problem.

Namely, in the case of a Montgomery multiplication residue calculation or a multiplication, X is added when Y[j]=1 with data in P register 108 being right-shifted. In doing so, the initial value of P is set to 0. Therefore the value in P register 108 is not changed until Y[j]=1. Once Y[j]=1, the value to be written in P register 108 varies for each iteration as the iteration includes the right-shift. Therefore the number of consecutive 0 bits from the lower bit of Y[j] can be determined for each input text by changing input texts and observing the timing at which the current depends on the input text.

Then power-residue calculating unit 1500 of the fourth embodiment generally performs the following process.

The value in P register is 0 for the first-time Y[j]=1. Specifically, irrespective of the prior values of P, if 0 is read from P register 108 at that time, ultimately the same result can be obtained. With the use of such a technique, the value in P register 108 prior to Y[j]=1 will be irrelevant to the final result. Therefore the initial value in P register 108 can be set to a value dependent on the input text, and with the current dependent on the input text throughout the period of bits of Y[j], the number of 0s can be externally unknown by Power Analysis.

As shown in FIG. 6, power-residue calculating unit 1500 of the fourth embodiment is provided with a first-Y[j] detecting portion 180 for detecting Y[j]=1 for the first time, and a configuration allowing 0 to be read from 0 register 140 in place of data to be read from P register 108 in accordance with the detection result.

Power-residue calculating unit 1500 of the fourth embodiment in FIG. 6 is a Montgomery multiplication residue circuit.

As shown in FIG. 6, in power-residue calculating unit 1500, the output of first-Y[j] detecting portion 180 is assumed as H.

In the power-residue process, a T register 182 is used in a following manner. T register 182 has its initial value of 0 and stores 1 when Y[j]=1 each time a process loop ends. Output H is "1" when (T=0) and (Y[j]=1).

```
T = 0
For j = 0 to 1023
    If H = 0 then
        M = (P+Y[j]·X) mod 2
        P = (P+Y[j]·X+M·N)/2
    Else
        M = (0+Y[j]·X) mod 2
        P = (0+Y[j]·X+M·N)/2
    If Y[j] = 1 then T = 1
End for
```

As shown in FIG. 6, during the Montgomery calculation, the detection signal H indicating that the first-time Y[j]=1 is detected is applied to one inputs of gate circuits 172 and 174. As a result, the value in 0 register 140 is selected in place of the value in P register 108 as an input of calculating unit 107 as follows, resulting in P=X.

| // during Montgomery calculation | |
|---|---|
| H | content of calculation |
| 0 | M = (P+Y[j]·X) mod 2 |
| 0 | P = (P+Y[j]·X+M·N)/2 |
| 1 | M = (0+Y[j]·X) mod 2 |
| 1 | P = (0+Y[j]·X+M·N)/2 |

Furthermore, as an example of the initial value for P register 108, the previous calculation result can be used as it is without initializing P register 108 in the Montgomery multiplication residue processing.

Because of the configuration as described above, when Y[j] is calculated from LSB (Least Significant Bit) in the multiplication and the Montgomery multiplication residue calculation, less dependency from the consumed current can be prevented until the first 1 appears. Therefore in the value P to be stored in P register 108, the number of consecutive 0s from LSB can hardly be discovered from the current variation pattern.

[Fifth Embodiment]

Figure 7:
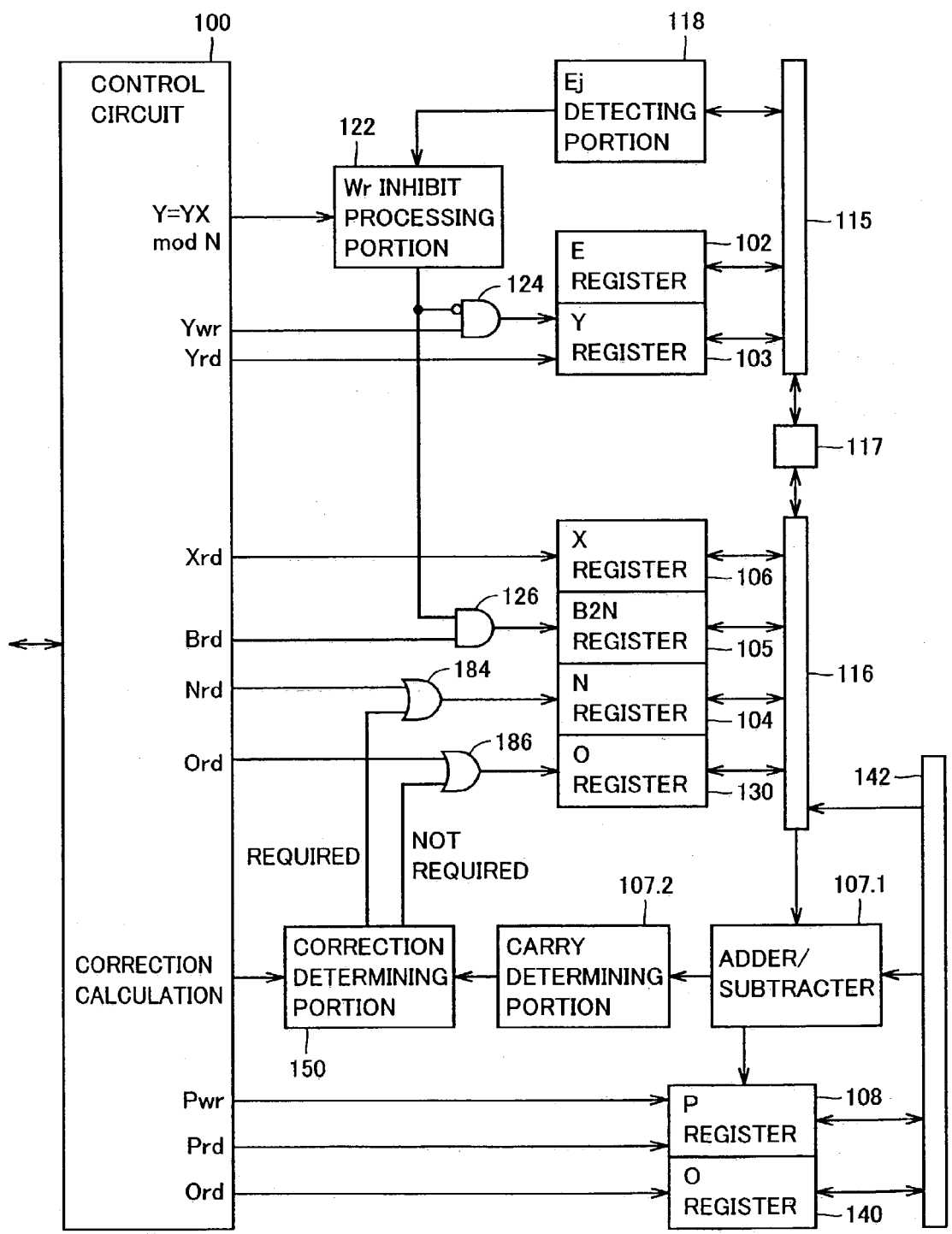
FIG. 7 is a schematic block diagram illustrating a configuration of a power-residue calculating unit 1600 in accordance with a fifth embodiment of the present invention.

FIG. 7 is a schematic block diagram illustrating a configuration of power-residue calculating unit 1600 in accordance with a fifth embodiment of the present invention.

In the following, the operation of power-residue calculating unit 1600 shown in FIG. 7 will be described by contrast with the operation of power-residue calculating unit 1100 shown in FIG. 2.

First, in the operation of power-residue calculating unit 1600 shown in FIG. 7, the following step S214 during the correction calculation in the operation of power-residue calculating unit 1100 shown in FIG. 2:

"Thereafter the following correction calculation is executed (step S214).

The value in N register 104 is read. The calculation (P+N) is executed in calculating unit 107.1. Here a right-shift is not performed. If the previous value in P register 108 is negative, the result of the calculation (P+N) is written into P register 108 with signal Pwr. On the other hand if the previous value in P register 108 is 0 or positive, signal Pwr is masked so that the result of the calculation (P+N) is not written into P register 108."

is changed as follows:

"Thereafter the following correction calculation is executed (step S214').

If the previous P is negative, data is read from N register 104, and if the previous P is 0 or positive, 0 is read from 0 register 130. The calculation result is written into P register 108 without write signal Pwr being masked."

In other words, power-residue calculating unit 1600 of the fifth embodiment aims to avoid the following problem.

Generally, calculating unit 107, P register 108 and the like are shared in order to realize the correction calculation with less additional hardware. In this case, since the value before the correction is in P register 108, the correction calculation may be executed for writing into P register 1080 only when the correction is required. Alternatively, in order to avoid the time variations resulting from the presence/absence of the correction calculation, the correction calculation may be executed whether the correction is required or not, and the write signal to P register may be masked when the correction is not required. With such a configuration, however, the consumed current varies depending on the presence/absence of the write signal to P register.

Power-residue calculating unit 1600 shown in FIG. 7 has a modified configuration of power-residue calculating unit 1300 of the second embodiment. Signals Nrd and 0rd controlling the reads of N register 104 and 0 register 130 are applied to one inputs of OR gates 184 and 186, respectively. The other inputs of OR gates 184 and 186 receive the outputs from correction determining portion 150 that determines whether the correction is required or not. Power-residue calculating unit 1600 does not include gate circuit 138' controlling the write into P register 108 depending on whether the correction is required or not.

More specifically, during the correction calculation, based on value P in P register 108 being positive/negative, that is, the carry of calculating unit 107.1 performing addition/subtraction, N register is selected and the calculation (P+N) is executed if the carry is negative. On the other hand, if the carry is positive, 0 register 130 is selected and the calculation (P+0) is executed. In either case, the calculation result is written into P register 108 so that the variations in the consumed current due to the presence/absence of the write can be avoided.

Data read from P register 108 is then stored in Y register 103.

With such a configuration, even if the correction is not required, the result is always written into the register. As a result, the variations in the consumed current resulting from the presence and absence of the write into the register can be avoided. Therefore it is less likely that, the processing is externally estimated using Power Analysis.

[Sixth Embodiment]

Figure 8:
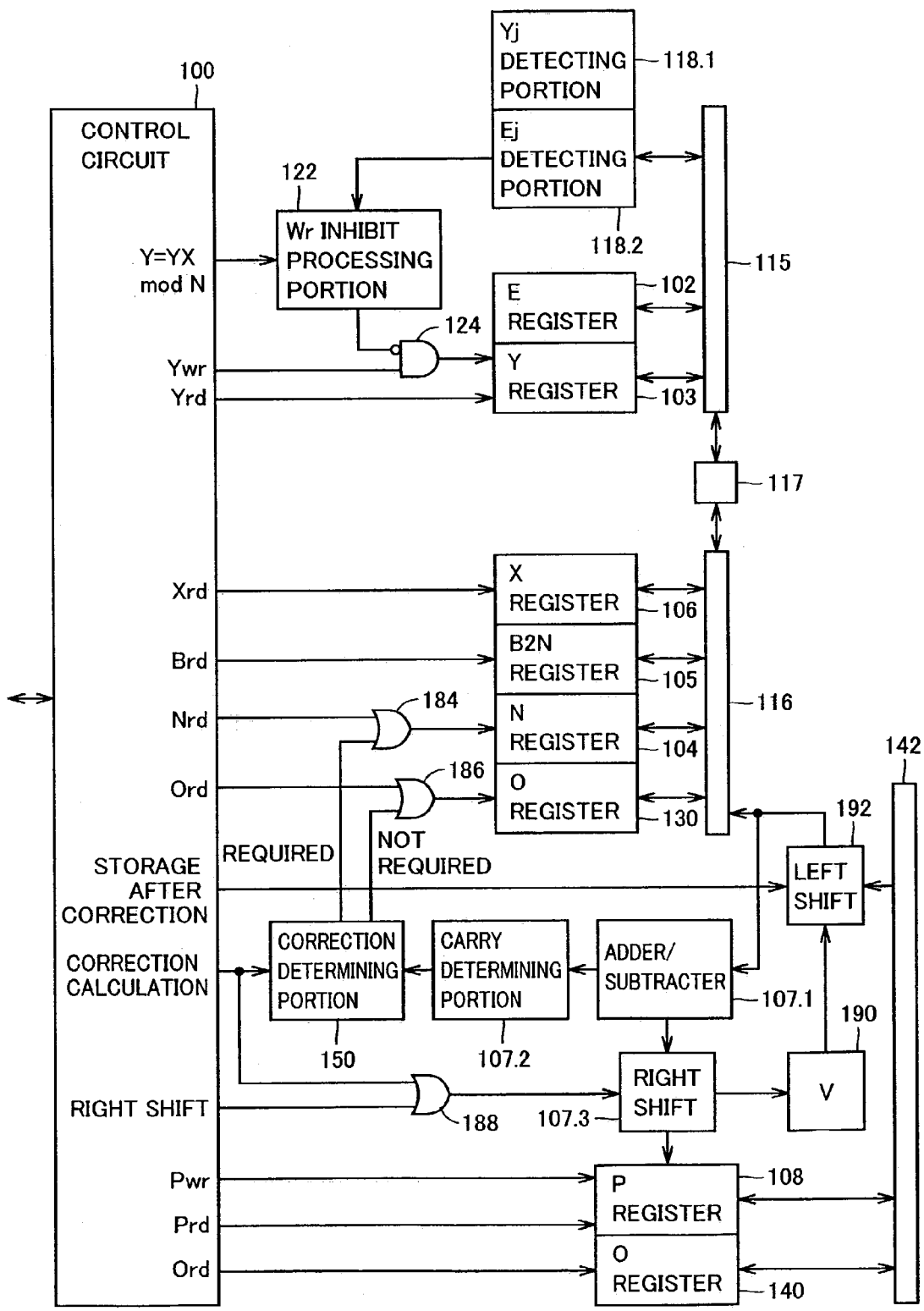
FIG. 8 is a schematic block diagram illustrating a configuration of a power-residue calculating unit 1700 in accordance with a sixth embodiment of the present invention.

FIG. 8 is a schematic block diagram illustrating a configuration of power-residue calculating unit 1700 in accordance with a sixth embodiment of the present invention.

In the following, the operation of power-residue calculating unit 1700 shown in FIG. 8 will be described by contrast with the operation of power-residue calculating unit 1600 shown in FIG. 7.

In the operation of power-residue calculating unit 1700 shown in FIG. 8, the following step S214' during the correction calculation in the operation of power-residue calculating unit 1600 shown in FIG. 7:

"Thereafter the following correction calculation is executed (step S214').

If the previous P is negative, data is read from N register 104, and if the previous P is 0 or positive, 0 is read from 0 register 130. The calculation result is written into P register 108 without write signal Pwr being masked."

is changed as follows:

"Thereafter the following correction calculation is executed (step S214").

If the previous P is negative, data is read from N register 104, and if the previous P is 0 or positive, 0 is read from 0 register 130. The calculation result is right-shifted and written into P register 108 without write signal Pwr being masked.

When the result is read from P register 108, it is restored by left-shift."

In other words, power-residue calculating unit 1700 of the sixth embodiment aims to avoid the following problem.

Namely, in power-residue calculating unit 1600 of the fifth embodiment, the current may still have slight variations because the same value (P+0) as stored in P or the different value (P+N) is written into P register 108. Therefore there may be a possibility of Power Analysis.

In order to eliminate such a problem, in power-residue calculating unit 1700 of the sixth embodiment, the right shift process is performed after the addition/subtraction in the correction calculation, though the right shift processing is not required, so that the value to be written into P register 108 after completion of the correction calculation may be varied even if the correction is not required. Therefore the consumed current has even less variations whether the correction is required or not.

The overflowing LSB during the right shift operations are stored in a V register 190 that is separately provided. When the value in P register 108 is transferred to another register, the correct value is restored by executing the left shift process and inputting the LSB value stored in V register 190.

Power-residue calculating unit 1700 shown in FIG. 8 is provided, in addition to the configuration of power-residue calculating unit 1600 of the fifth embodiment, with V register 190 that stores the carry in the right shift process performed after the process in calculating unit 107, and providing the stored value for the left shift process performed on the data that has been read from P register 108. Right shift circuit 107.3 is controlled by an OR circuit 188 outputting a signal to be active when control circuit 100 provides the instructions for the correction calculation and the right shift process. Power-residue calculating unit 1700 is further provided with a left shift circuit 192 for performing the left shift process described above.

P register 108 stores a value different from the value originally stored in P register 108 (the right-shifted value) by executing the correction calculation, writing LSB into V register 190 and performing the right shift process.

When data is read from P register 108 after the execution of the correction calculation, a left shift is performed in left shift circuit 192 and the value in V register 190 is input for LSB. That value is stored in Y register 103.

With the configuration as described above, the operation of writing the same value as originally stored in P register 108 is written into P register 108 again in the correction calculation can be eliminated, and the increased/decreased current depending on the presence/absence of the correction can be avoided in the process of writing into P register 108.

[Seventh Embodiment]

Figure 9:
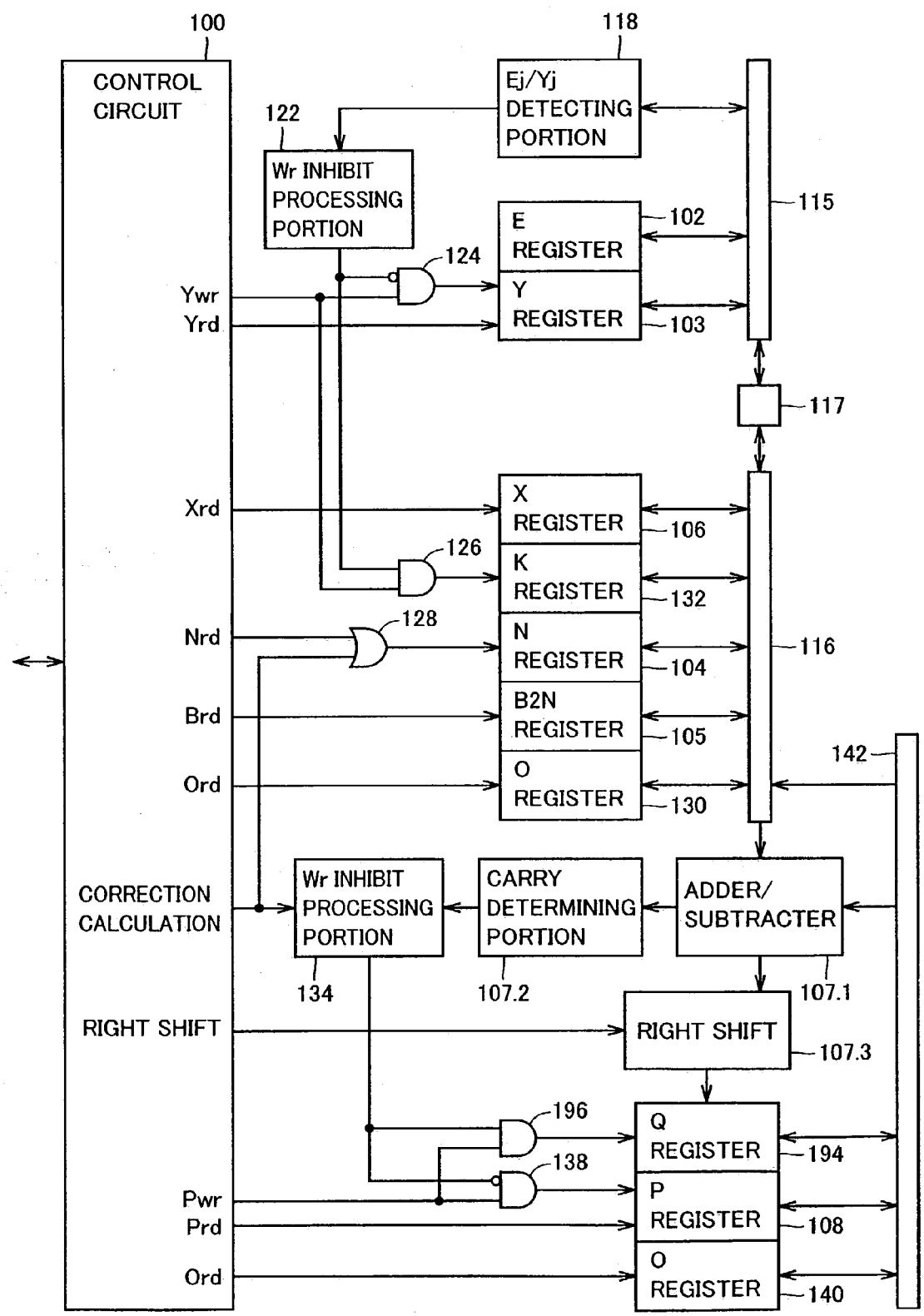
FIG. 9 is a schematic block diagram illustrating a configuration of a power-residue calculating unit 1800 in accordance with a seventh embodiment of the present invention.

FIG. 9 is a schematic block diagram illustrating a configuration of a power-residue calculating unit 1800 in accordance with a seventh embodiment of the present invention.

In the following, the operation of power-residue calculating unit 1800 shown in FIG. 9 will be described by contrast with the operation of power-residue calculating unit 1100 shown in FIG. 2.

First, in the operation of power-residue calculating unit 1800 shown in FIG. 9, the following step S214 during the correction calculation in the operation of power-residue calculating unit 1100 shown in FIG. 2:

"Thereafter the following correction calculation is executed (step S214).

The value in N register 104 is read. The calculation (P+N) is executed in calculating unit 107.1. Here a right-shift is not performed. If the previous value in P register 108 is negative, the result of the calculation (P+N) is written into P register 108 with signal Pwr. On the other hand if the previous value in P register 108 is 0 or positive, signal Pwr is masked so that the result of the calculation (P+N) is not written into P register 108."

is changed as follows:

"Thereafter the following correction calculation is executed (step S214").

The value in N register 104 is read. The calculation (P+N) is executed in calculating unit 107.1. Here a right shift is not performed. If the previous value in P register 108 is negative, the result of the calculation (P+N) is written into P register 108 with signal Pwr. On the other hand, if the previous value in P register 108 is 0 or positive, the result of the calculation (P+N) is written into a separate Q register 194."

Therefore power-residue calculating unit 1800 of the seventh embodiment also aims to avoid the same problem as power-residue calculating unit 1700 of the sixth embodiment aims to avoid.

In order to eliminate such a problem, power-residue calculating unit 1800 of the seventh embodiment 1800 is provided, in addition to the configuration of power-residue calculating unit 1200 of the first embodiment, with Q register 194 and a gate circuit 196 receiving the output from Wr inhibit processing portion 134 and write signal Pwr to be ANDed for producing a signal controlling a write into Q register 194.

In such a configuration, the correction calculation (P+N) itself is always executed whether the correction calculation is required or not, and Q register 194 is provided for storing the result even if the correction calculation is not required. The calculation result (P+N) is written into Q register 194 depending on whether the correction is required or not in a manner mutually exclusive to P register 108.

In the configuration as described above, the value of the calculation value (P+N) is normally different from both the value originally stored in Q register 194 and the value originally stored in P register 108. This can reduce the current difference depending on whether the value to be written into P register 108 is same as the value originally stored in P register 108

[Eighth Embodiment]

Figure 10:
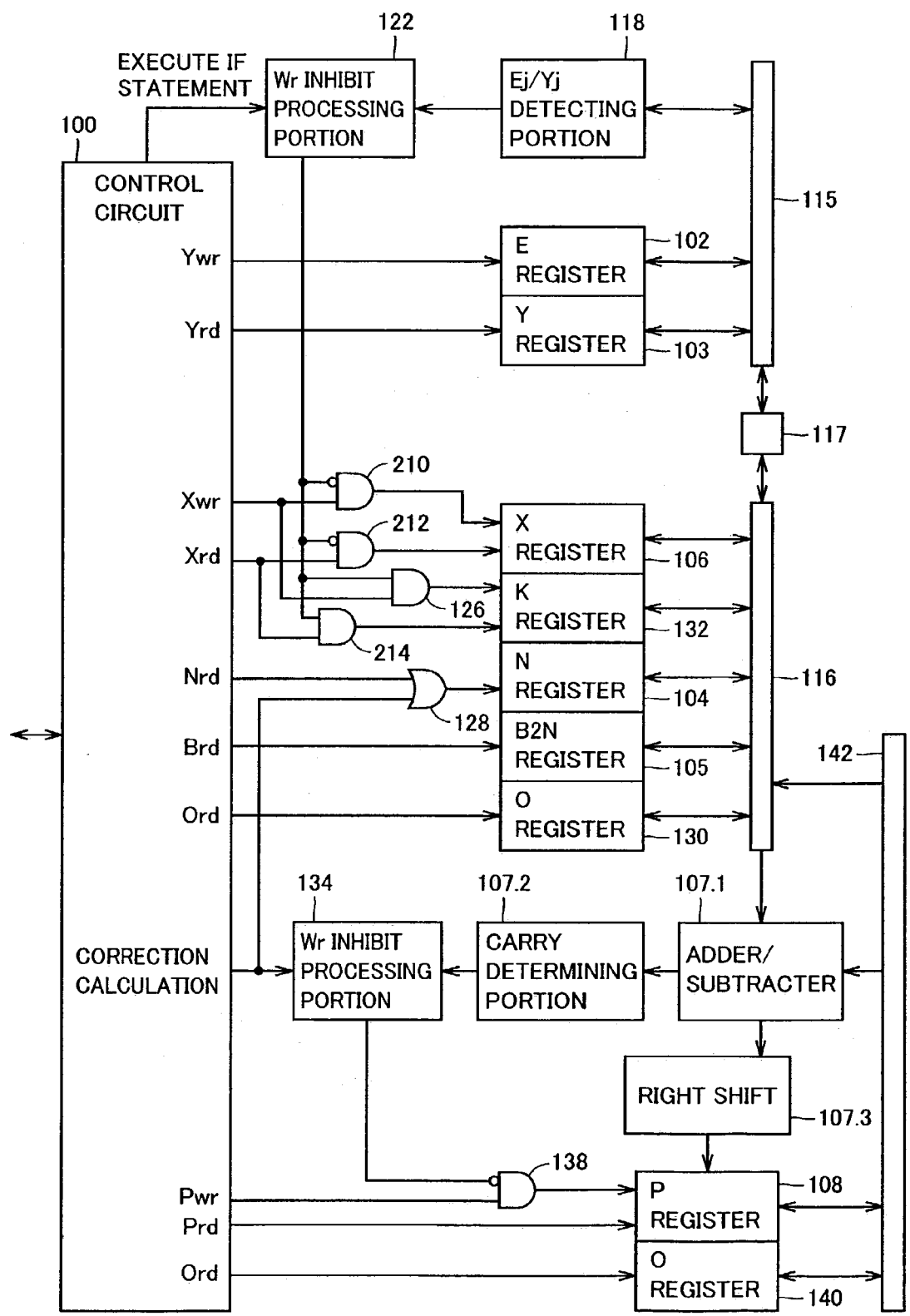
FIG. 10 is a schematic block diagram illustrating a configuration of a power-residue calculating unit 1900 in accordance with an eighth embodiment of the present invention.

FIG. 10 is a schematic block diagram illustrating a configuration of power-residue calculating unit 1900 in accordance with an eighth embodiment of the present invention.

The aim of power-residue calculating unit 1900 of the eighth embodiment is as follows. In the case of the left binary, the value of multiplier Y is different between the multiplication and the following square calculation for e[j]=1, while that value is same for e[j]=0. In the case of the right binary, the value of multiplicand X is different between the multiplication and the following multiplication for e[j]=0, while that value is same for e[j]=1. Therefore the same pattern is included in the consumed current only when e[j]=0, resulting in a possible susceptibility to Power Analysis. Power-residue calculating unit 1900 of the eighth embodiment eliminates this possibility.

In power-residue calculating unit 1900 of the eighth embodiment shown in FIG. 10, the configuration of power-residue calculating unit 1200 of the first embodiment is modified such that it is adapted to the right binary method described above and the multiplicand is set to the value in K register 132 rather than to X when the determination of the if statement is "false".

Therefore, as compared to power-residue calculating unit 1200, in power-residue calculating unit 1900, gate circuit 124 is omitted and signal Ywr is applied to Y register 103 as it is. In addition, provided are a gate circuit 210 providing to X register 106 AND between inverted level of the signal from Wr inhibit processing portion 122 and signal Xwr, and a gate circuit 212 providing to X register 106 AND between an inverted level of the signal from Wr inhibit processing portion 122 and signal Xrd.

Gate circuit 126 receives signal Xrd in place of signal Ywr. Multiplication residue calculating circuit 1900 is further provided with a gate circuit 214 providing to K register 132 AND between the signal from Wr inhibit processing portion 122 and signal Xrd.

The remaining configuration is similar to the configuration of multiplication residue calculating circuit 1200 of the first embodiment. Therefore the same components will be denoted with the same reference characters and the description thereof will not be repeated.

In the process of this power-residue calculating unit 1900, the iterative portion in the binary method is as follows:

```
for j = 0 to 1023
    if e[j] = 1  then  X = X×Y/R mod N else K = K×Y/R mod N
    Y = Y×Y/R mod N
end for.
```

In power-residue calculating unit 1900, signal Ywr is a signal for writing the result of the square calculation into Y register 103. Signal Xwr is a signal for writing the multiplication result into X register 106 when e[j]=1 and into K register 132 when e[j]=0. Signal Xrd is a signal for reading a multiplier from X register 106 when e[j]=1 and from K register 132 when e[j]=0.

With the configuration as described above, in the processing of power-residue calculating unit 1900, the value in Y register 103 always varies only in the square calculation, irrespective of e[j].

Where e[j]=1 with a multiplier of X, X always varies. Where e[j]=0 with a multiplier of K, K always varies as well.

Therefore the value of the multiplier is different for each iteration so that the correlation of the consumed current in execution of multiplication with e[j] can be further reduced.

Note that the left binary method is used as follows.

In the case of the left binary method, the iterative portion is as follows:

```
for j = 1023 to 0
    Y = Y×Y/R mod N
    if e[j] = 1  then Y = X×Y/R mod N else J = X×J/R mod N
end for
``` where J is a value stored in a register provided as a dummy of a multiplicand. The effect is similar to that in the right binary method. The diagram and description showing the configuration thereof will be omitted as it can be realized by providing a dummy register J as described above in FIG. 10.

It is noted that although in the first to eighth embodiments the configurations of power-residue calculating units corresponding to the respective aims are respectively described above, it is possible to implement a power-residue calculating unit capable of handling two or more aims at the same time. The present invention can be applied to either the right binary method or the left binary method.

Although the present invention has been described and illustrated in detail, it is clearly understood that the same is by way of illustration and example only and is not to be taken by way of limitation,.the spirit and scope of the present invention being limited only by the terms of the appended claims.

What is claimed is:

1. A power-residue calculating unit comprising:
a first register group holding a first kind of data;
a second register group holding a kind of data to be referred to concurrently with the data held in said first register group;
a first internal bus connected to said first register group;
a second internal bus connected to said second register group;
a Montgomery multiplication residue calculation executing portion connected to said first and second internal buses for concurrently referring to values held in said first and second register groups and executing a Montgomery multiplication residue calculation;
a power-residue calculation executing portion connected to said first and second internal buses and said Montgomery multiplication residue calculation executing portion for concurrently referring to values held in said first and second register groups, communicating data with said Montgomery multiplication residue calculation executing portion, and executing a power-residue calculation; and
a pseudo calculation executing portion for executing in a pseudo manner an intermediate calculation process that can be omitted to obtain each calculation result of said Montgomery multiplication residue calculation and said power-residue calculation.

2. The power-residue calculating unit according to claim 1 wherein
said pseudo calculation executing portion includes a dummy register connected to said first internal bus for once storing an intermediate calculation result to be discarded when said power-residue calculation is executed in accordance with a binary method.

3. The power-residue calculating unit according to claim 1 wherein
said first register group includes an intermediate result storing register for storing an intermediate result of said power-residue calculation when said power-residue calculation is executed in accordance with a binary method, and
said pseudo calculation executing portion includes a replacing portion replacing said intermediate result at a time when 1 first appears starting from a most significant bit of a binary integer bit value representative of a power, with a value of a number to be raised to said power, rather than setting an initial value of said intermediate result storing register as a unit element.

4. The power-residue calculating unit according to claim 3 wherein
said replacing portion replaces said intermediate result with a value of a number to be raised to said power by storing an operand changed to a sum of 0 and said number to be raised into said intermediate result storing register, in a calculation of said intermediate result to be stored in said intermediate result storing register, in a correction calculation of said Montgomery multiplication residue.

5. The power-residue calculating unit according to claim 1 wherein
said second register group includes an accumulative addition register storing a value in the middle of an iterative accumulative addition, and
said pseudo calculation executing portion includes a reading portion reading a value 0 as a value in said accumulative addition register in place of a value in said accumulative addition register when 1 first appears starting from a least significant bit of each bit value of a multiplier, rather than setting an initial value in said accumulative addition register as an additive identity.

6. The power-residue calculating unit according to claim 1 wherein
said second register group includes an accumulative addition register storing a value in the middle of an iterative accumulative addition in said Montgomery multiplication residue calculation,
said Montgomery multiplication residue calculation executing portion includes an accumulative adder for use in common with both said Montgomery multiplication residue calculation and a correction calculation for said Montgomery multiplication residue calculation, and
said pseudo calculation executing portion includes a register input/output portion for performing a write operation for said accumulative addition register independently of whether said correction calculation is required or not.

7. The power-residue calculating unit according to claim 6 wherein
said register input/output portion includes
a right shift portion performing right shift processing on a result of said correction calculation for writing into said accumulative addition register,
a temporary holding register for holding a least significant bit of a result of said correction calculation in said right shift processing, and
a left shift portion left-shifting a read value from said accumulative addition register and adding a value stored in said temporary holding register to a left-shift result as a least significant bit.

8. The power-residue calculating unit according to claim 1 wherein said second register group includes an accumulative addition register storing a value in the middle of an iterative accumulative addition in said Montgomery multiplication residue calculation and a dummy register, said Montgomery multiplication residue calculation executing portion includes an accumulative adder for use in common with both said Montgomery multiplication residue calculation and a correction calculation in said Montgomery multiplication residue calculation, and said pseudo calculation executing portion includes a register input/output portion performing a write operation for said accumulative addition register when said correction calculation is required, and performing a write operation for said dummy register when said correction calculation is not required.

9. The power-residue calculating unit according to claim 1 further comprising a dummy register for providing an input of a calculation when an intermediate calculation result to be discarded is calculated, and once storing said intermediate calculation result to be discarded.

* * * * *